United States Patent
Kim et al.

(10) Patent No.: US 11,331,978 B2
(45) Date of Patent: May 17, 2022

(54) INTEGRATED HEAT MANAGEMENT SYSTEM OF VEHICLE

(71) Applicant: Hanon Systems, Daejeon (KR)

(72) Inventors: Doo Hoon Kim, Daejeon (KR); Hyeon Gyu Kim, Daejeon (KR); Kyung Ju An, Daejeon (KR); Sang Jun Yoo, Daejeon (KR); Joong Man Han, Daejeon (KR)

(73) Assignee: Hanon Systems, Daejeon (KR)

( * ) Notice: Subject to any disclaimer, the term of this patent is extended or adjusted under 35 U.S.C. 154(b) by 357 days.

(21) Appl. No.: 16/380,299

(22) Filed: Apr. 10, 2019

(65) Prior Publication Data
US 2019/0315185 A1    Oct. 17, 2019

(30) Foreign Application Priority Data
Apr. 11, 2018    (KR) ........................ 10-2018-0042027

(51) Int. Cl.
*B60H 1/00*    (2006.01)
*B60L 58/26*    (2019.01)
*B60H 1/32*    (2006.01)

(52) U.S. Cl.
CPC ..... *B60H 1/00278* (2013.01); *B60H 1/00899* (2013.01); *B60H 1/3208* (2013.01); *B60H 1/3228* (2019.05); *B60L 58/26* (2019.02)

(58) Field of Classification Search
CPC ........ B60H 1/00; B60H 1/32; B60H 1/00278; B60H 1/00899; B60H 1/3208; B60H 1/3228; B60H 1/143; B60H 1/00921; B60H 2001/00928; B60L 58/26
See application file for complete search history.

(56) References Cited

U.S. PATENT DOCUMENTS

| | | | | |
|---|---|---|---|---|
| 4,549,404 | A * | 10/1985 | Lord | F25B 49/02 62/224 |
| 2018/0287225 | A1* | 10/2018 | Haag | H01M 10/613 |
| 2019/0221899 | A1* | 7/2019 | Tomai | H01M 10/6568 |
| 2020/0207182 | A1* | 7/2020 | Ishizeki | B60H 1/22 |
| 2020/0346520 | A1* | 11/2020 | Ishizeki | B60H 1/32284 |

FOREIGN PATENT DOCUMENTS

JP    2015059458 A  *  3/2015

* cited by examiner

*Primary Examiner* — Harry E Arant
(74) *Attorney, Agent, or Firm* — Norton Rose Fulbright US LLP; James R. Crawford

(57) ABSTRACT

An integrated heat management system for a vehicle includes an air conditioner configured to cool or heat a passenger compartment using a refrigerant, a water-cooled cooling device configured to cool a specific device using the refrigerant of the air conditioner, and an air conditioning load change preventing unit configured to prevent a sudden change in an air conditioning load of the air conditioner when turning on or off the water-cooled cooling device with respect to the air conditioner.

4 Claims, 10 Drawing Sheets

INTEGRATED HEAT MANAGEMENT SYSTEM OF VEHICLE

CROSS-REFERENCE TO RELATED PATENT APPLICATIONS

This application claims the benefit of Korean Patent Application No. 10-2018-0042027 filed Apr. 11, 2018. The disclosure of the above patent application is hereby incorporated herein by reference in their entirety.

TECHNICAL FIELD

The present invention relates to an integrated heat management system for a vehicle and, more particularly, to an integrated heat management system for a vehicle capable of preventing a sudden change in an air conditioning load of an air conditioner which may occur when a water-cooled cooling device is turned on or off with respect to the air conditioner and consequently preventing a decrease in the cooling performance of the air conditioner due to the sudden change in the air conditioning load and a sudden change in a temperature of an air discharged into a passenger compartment.

BACKGROUND ART

Examples of environmentally friendly vehicles include an electric vehicle, a hybrid vehicle and a fuel cell vehicle (hereinafter collectively referred to as "vehicle").

Such vehicles are equipped with various heat management devices. For example, as shown in FIG. 1, the heat management device includes an air conditioner 10 for cooling and heating a passenger compartment, a water-cooled battery cooling device 20 for cooling a battery B, and the like.

The air conditioner 10 is of a heat pump type and is used for cooling or heating purposes while being controlled in an air conditioner mode or a heat pump mode depending on the flow direction of a refrigerant in a first refrigerant line 12.

In particular, in the air conditioner mode, a refrigerant is circulated through an air conditioning cycle including a compressor 14, a water-cooled heat exchanger 15, an outdoor heat exchanger 17, an air conditioning mode expansion valve 18 and an indoor heat exchanger 19. Through the circulation of the refrigerant, a low-temperature cold air is generated in the indoor heat exchanger 19 to cool a passenger compartment with the cold air thus generated.

In the heat pump mode, a refrigerant is circulated through a heat pump cycle including a compressor 14, a water-cooled heat exchanger 15 and a heat pump mode expansion valve 16 and an outdoor heat exchanger 17. Heat having a high temperature is generated in the water-cooled heat exchanger 15 through the circulation of the refrigerant, and the heat thus generated is transferred to a heater core side cooling water circulation line 30. As a result, the high temperature heat transferred to the heater core side cooling water circulation line 30 is radiated into the passenger compartment through a heater core 32 to heat the passenger compartment.

In the cooling mode, the battery cooling device 20 cools the battery B using the refrigerant of the air conditioner 10.

Particularly, a part of the refrigerant in the air conditioner 10 is diverted to a second refrigerant line 22, and the diverted refrigerant is expanded and depressurized by the battery-cooling expansion valve 24. Then, the depressurized/expanded refrigerant having a low temperature and the cooling water in a cooling water circulation line 25 are caused to exchange heat in a refrigerant-cooling water heat exchanger 26 to cool the cooling water. The cooled cooling water is circulated through the battery B by the cooling water circulation line 25 and the water pump 27, thereby cooling the battery B.

Although not shown in the drawings, the heat management device may further include a water-cooled electric component module cooling device for cooling an electric component module of a vehicle using the refrigerant of the air conditioner 10.

As with the battery cooling device 20, the water-cooled electric component module cooling device diverts, expands and depressurizes a part of the refrigerant of the air conditioner 10. Then, the depressurized/expanded refrigerant having a low temperature and the cooling water are caused to exchange heat. The heat-exchanged cooling water having a low temperature is circulated through an electric component module to cool the electric component module (Hereinafter, the water-cooled battery cooling device 20 and the water-cooled electric component module cooling device using the refrigerant of the air conditioner 10 are collectively referred to as "water-cooled cooling device").

Such a conventional vehicle has a problem that when the water-cooled cooling device, for example, the water-cooled battery cooling device 20 is additionally turned on while the air conditioner 10 is in operation, a sudden change in the flow rate and a sudden change in the air conditioning load may occur, as a result of which temperature of the air discharged into the passenger compartment becomes unstable.

Particularly, when the battery cooling system 20 is further turned on while the air conditioner 10 is in operation, the air conditioning load of the air conditioner 10 already in operation is suddenly increased. The cooling performance of the air conditioner 10 is drastically deteriorated due to the rapid increase in the air conditioning load.

As a result, as shown in FIG. 2, the temperature of the air discharged into the passenger compartment is suddenly increased (as indicated by A) and the rotational speed of the compressor 14 is sharply increased (as indicated by B) from the point of time when the battery cooling expansion valve 24 of the battery cooling device 20 is turned on.

As a result, the cooling effect of the passenger compartment is remarkably lowered, the comfort in the passenger compartment is deteriorated, and the fuel efficiency of the vehicle is lowered.

Furthermore, as shown in FIG. 1, the conventional vehicle has a problem that when the water-cooled battery cooling device 20 is turned off in a state in which the air conditioner 10 and the water-cooled cooling device, for example, the water-cooled battery cooling device, are operated simultaneously, a sudden change in the flow rate and a sudden change in the air conditioning load may occur in the air conditioner 10 in operation, as a result of which the temperature of the air discharged into the passenger compartment becomes unstable.

In particular, when the water-cooled battery cooling device 20 is turned off while the air conditioner 10 and the water-cooled battery cooling device 20 are simultaneously operated, the air conditioning load of the air conditioner 10 is rapidly lowered, as a result of which the cooling performance of the air conditioner 10 is excessively increased.

As a result, as shown in FIG. 3, there is a problem that the temperature of the air discharged into the passenger compartment suddenly drops from the point of time when the battery cooling expansion valve 24 of the battery cooling device 20 is turned off (as indicated by C).

Consequently, there is a problem that the cooling effect of the passenger compartment is remarkably lowered and the comfort in the passenger compartment is deteriorated.

SUMMARY

In view of the aforementioned problems inherent in the related art, it is an object of the present invention to provide an integrated heat management system for a vehicle capable of preventing a sudden change in an air conditioning load which may occur when a water-cooled cooling device is additionally turned on while an air conditioner is already turned on.

Another object of the present invention is to provide an integrated heat management system for a vehicle capable of preventing a sudden change in an air conditioning load of an air conditioner which may occur when a water-cooled cooling device is additionally turned on and consequently preventing a decrease in the cooling performance of the air conditioner due to the sudden change in the air conditioning load and a sudden temperature change of an air discharged into a passenger compartment.

A further object of the present invention is to provide an integrated heat management system for a vehicle capable of preventing a sudden change in an air conditioning load which may occur in an air conditioner when a water-cooled cooling device is turned off while the air conditioner and the water-cooled cooling device are turned on.

A still further object of the present invention is to provide an integrated heat management system for a vehicle capable of preventing an excessive increase in the cooling performance of an air conditioner and a resultant sudden temperature change of an air discharged into a passenger compartment by preventing a sudden change in an air conditioning load which may occur in an air conditioner when a water-cooled cooling device is turned off while the air conditioner and the water-cooled cooling device are turned on.

A yet still further object of the present invention is to provide an integrated heat management system for a vehicle capable of improving the comfort in a passenger compartment by preventing a decrease in the cooling performance of an air conditioner due to the sudden change in the air conditioning load and a resultant sudden temperature change of an air discharged into a passenger compartment.

According to one aspect of the present invention, there is provided an integrated heat management system for a vehicle, including: an air conditioner configured to cool or heat a passenger compartment using a refrigerant; a water-cooled cooling device configured to cool a specific device using the refrigerant of the air conditioner; and an air conditioning load change preventing unit configured to prevent a sudden change in an air conditioning load of the air conditioner when turning on or off the water-cooled cooling device with respect to the air conditioner.

In the system, the air conditioner may include a first refrigerant line configured to cool or heat the passenger compartment, a second refrigerant line configured to divert a part of the refrigerant in the first refrigerant line, an expansion valve installed in the second refrigerant line, a refrigerant-cooling water heat exchanger installed in the second refrigerant line, a cooling water circulation line configured to transfer cold energy of the refrigerant to a specific device using the refrigerant-cooling water heat exchanger and a water pump configured to circulate cooling water through the cooling water circulation line, and the air conditioning load change preventing unit may include a control unit configured to differently control operation timings of the expansion valve and the water pump when the water-cooled cooling device is turned on or off with respect to the air conditioner.

In the system, the control unit may be configured to differently control the operation timings of the expansion valve and the water pump according to a temperature of the specific device and a temperature of the cooling water in the cooling water circulation line when the water-cooled cooling device is turned on or off with respect to the air conditioner.

In the system, the control unit may be configured to control a compressor of the air conditioner when the water-cooled cooling device is turned on or off with respect to the air conditioner.

In the system, the air conditioner may include a first refrigerant line configured to cool or heat the passenger compartment, a second refrigerant line configured to divert a part of the refrigerant in the first refrigerant line, an expansion valve installed in the second refrigerant line, a refrigerant-cooling water heat exchanger installed in the second refrigerant line, a cooling water circulation line configured to transfer cold energy of the refrigerant to a specific device using the refrigerant-cooling water heat exchanger and a water pump configured to circulate cooling water through the cooling water circulation line, and the air conditioning load change preventing unit may include a control unit configured to differently control an operation order of the expansion valve and the water pump according to an on/off operation of the compressor of the first refrigerant line.

In the integrated heat management system for a vehicle according to the present invention, when the water-cooled battery cooling device using the refrigerant of the air conditioner is to be additionally operated (turned on) while the air conditioner is in operation, the battery is first cooled by the cooling water of the water-cooled battery cooling device without having to immediately use the refrigerant of the air conditioner, and then the battery is cooled by the refrigerant of the air conditioner with a time lag. Therefore, unlike the conventional technique in which the refrigerant of the air conditioner is immediately used to cool the battery, it is possible to prevent a sudden increase in the air conditioning load of the air conditioner which may occur at the time of cooling the battery.

Furthermore, by preventing the sudden increase in the air conditioning load of the air conditioner which may occur at the time of cooling the battery, it is possible to prevent a decrease in the cooling performance of the air conditioner due to the sudden change in the air conditioning load and a resultant sudden temperature change of the air discharged into a passenger compartment.

When the water-cooled battery cooling device using the refrigerant of the air conditioner is to be turned off while the air conditioner is in operation, the circulation of the cooling water in the water-cooled battery cooling device is first stopped without immediately turning off the water-cooled battery cooling device, and then the water-cooled battery cooling device is turned off with a time leg. Therefore, unlike the conventional technique in which the water-cooled battery cooling device is immediately turned off when there is no need to cool the battery, it is possible to prevent a sudden decrease in the air conditioning load of the air conditioner which may occur when the water-cooled battery cooling device is turned off.

Furthermore, by preventing the sudden decrease in the air conditioning load of the air conditioner which may occur when the water-cooled battery cooling device is turned off, it is possible to prevent an excessive increase in the cooling performance of the air conditioner due to the sudden change in the air conditioning load and a resultant sudden temperature change of the air discharged into a passenger compartment.

In addition, by preventing the excessive increase in the cooling performance of the air conditioner due to the sudden change in the air conditioning load and the resultant sudden temperature change of the air discharged into a passenger compartment, it is possible to improve the comfort in the passenger compartment.

BRIEF DESCRIPTION OF THE DRAWINGS

FIG. 2 is a graph showing an example of an operation of a conventional integrated heat management system for a vehicle, wherein a change in a rotational speed (RPM) of a compressor of an air conditioner, a change in a temperature of an indoor heat exchanger and a change in a temperature of an air discharged into a passenger compartment are shown when a water-cooled battery cooling device is additionally turned on in a state in which an air conditioner is turned on.

FIG. 3 is a graph showing an example of an operation of a conventional integrated heat management system for a vehicle, wherein a change in a rotational speed (RPM) of a compressor of an air conditioner, a change in a temperature of an indoor heat exchanger and a change in a temperature of an air discharged into a passenger compartment are shown when a water-cooled battery cooling device is turned off in a state in which an air conditioner and a water-cooled battery cooling device are turned on.

FIG. 5 is a graph showing an example of an operation of an integrated heat management system for a vehicle according to the present invention, wherein a change in a rotational speed (RPM) of a compressor of an air conditioner, a change in a temperature of an indoor heat exchanger and a change in a temperature of an air discharged into a passenger compartment are shown when a water-cooled battery cooling device is additionally turned on in a state in which an air conditioner is turned on.

FIG. 6 is a graph showing an example of an operation of an integrated heat management system for a vehicle according to the present invention, wherein a change in a rotational speed (RPM) of a compressor of an air conditioner, a change in a temperature of an indoor heat exchanger and a change in a temperature of an air discharged into a passenger compartment are shown when a water-cooled battery cooling device is turned off in a state in which an air conditioner and a water-cooled battery cooling device are turned on.

DETAILED DESCRIPTION

Figure 1:
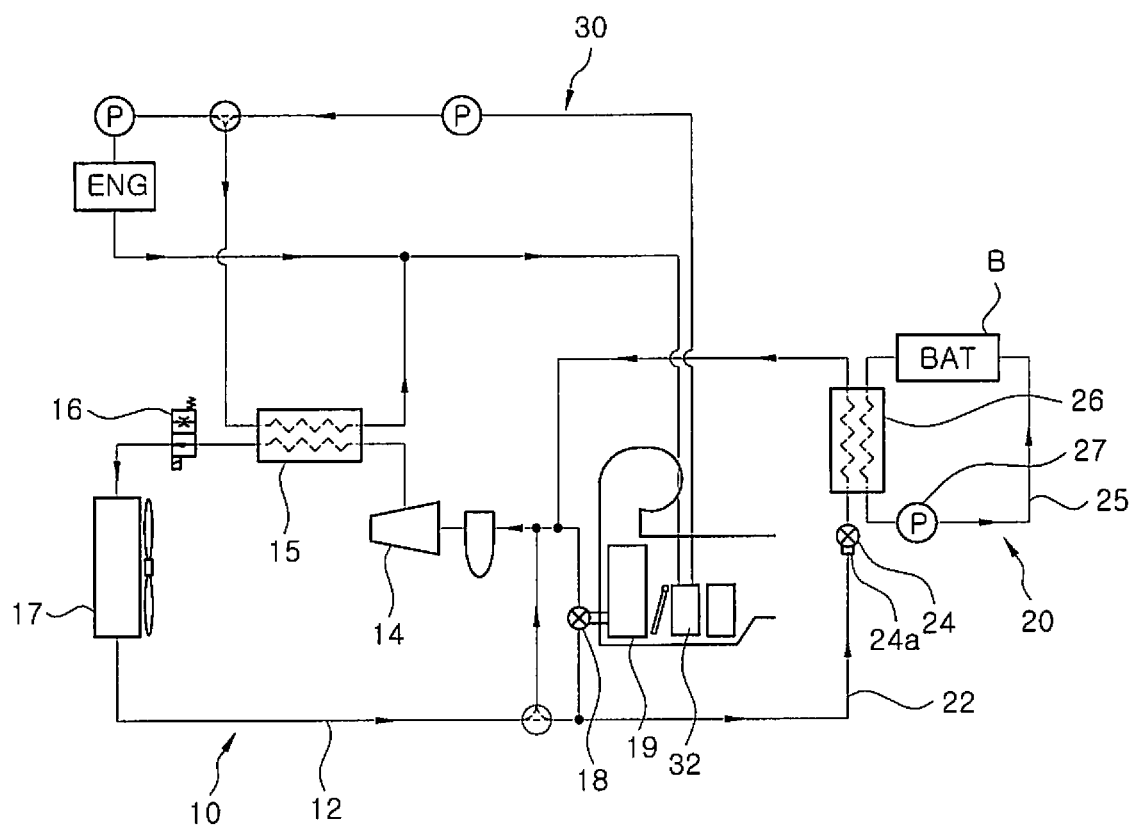
FIG. 1 is a diagram showing a conventional integrated heat management system for a vehicle.
Figure 2:
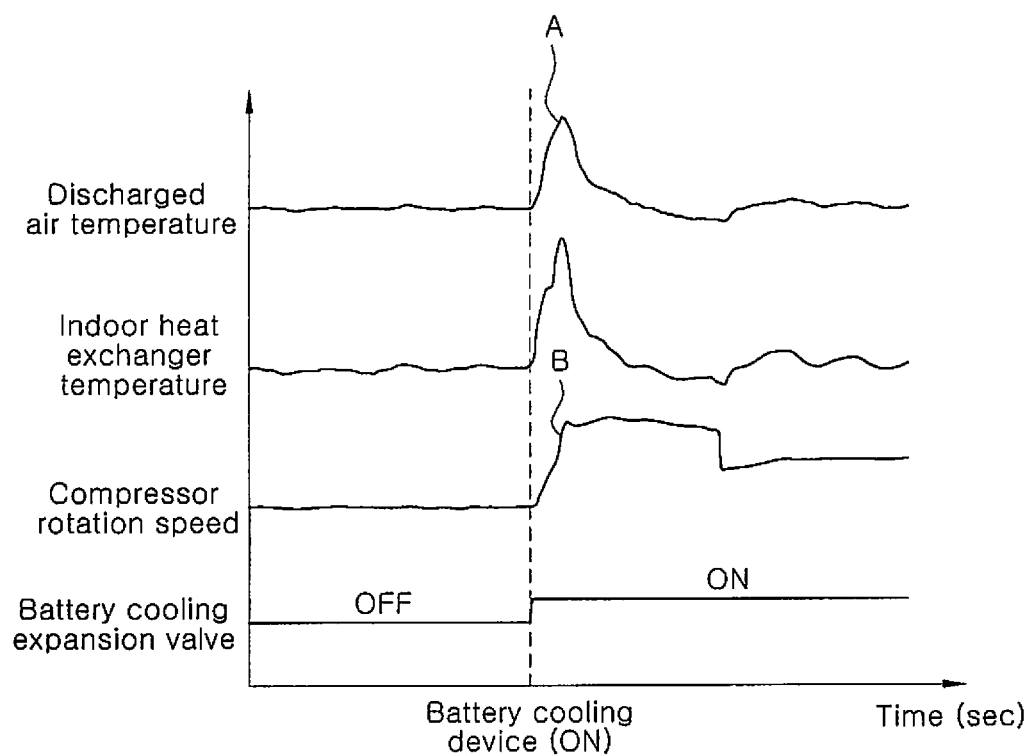
Figure 3:
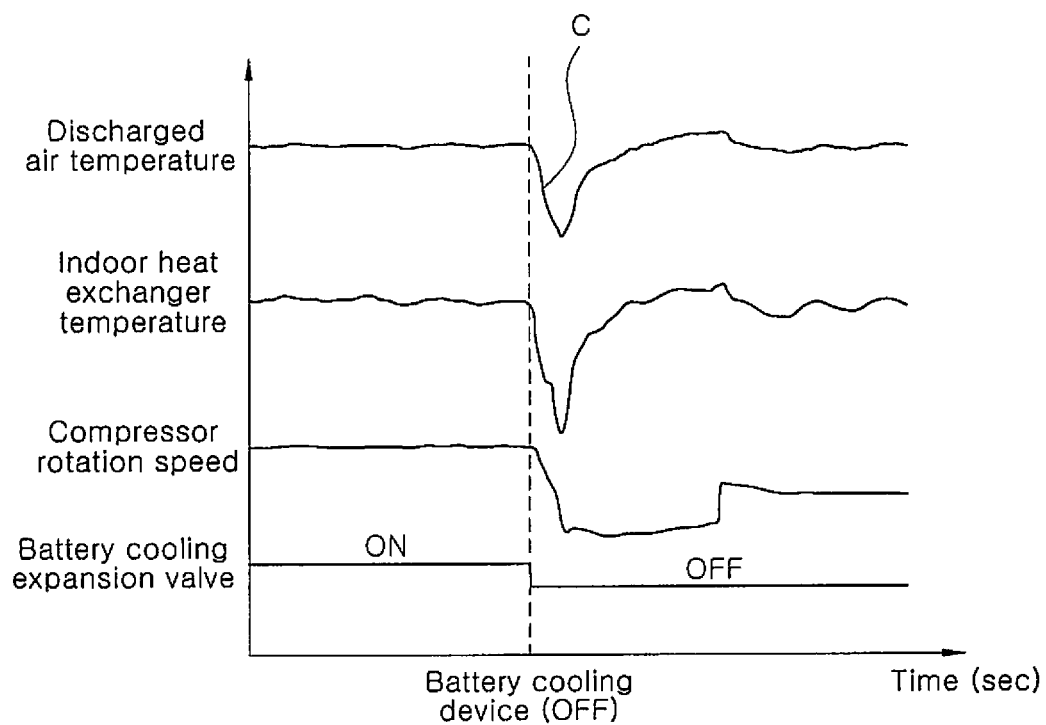

Preferred embodiments of an integrated heat management system for a vehicle according to the present invention will now be described in detail with reference to the accompanying drawings. The same components as those described in the section of Background Art are designated by like reference numerals.

First Embodiment

Prior to describing features of an integrated heat management system for a vehicle according to the present invention, an integrated heat management system for a vehicle will be briefly described with reference to FIG. 4.

The integrated heat management system for a vehicle includes an air conditioner 10 configured to cool and heat a passenger compartment.

The air conditioner 10 may be of a heat pump type and may include a first refrigerant line 12. A compressor 14, a water-cooled heat exchanger 15, a heat pump mode expansion valve 16, an outdoor heat exchanger 17, an air conditioner mode expansion valve 18 and an indoor heat exchanger 19 are provided in the first refrigerant line 12.

At the time of cooling a passenger compartment, the first refrigerant line 12 is controlled in an air conditioner mode to close the heat pump mode expansion valve 16.

Thus, the refrigerant in the first refrigerant line 12 is circulated without going through the heat pump mode expansion valve 16. A cold air having a low temperature is generated in the indoor heat exchanger 19 by such circulation of the refrigerant to cool the passenger compartment.

At the time of heating the passenger compartment, the first refrigerant line 12 is controlled in a heat pump mode to open the heat pump mode expansion valve 16.

Thus, the refrigerant in the first refrigerant line 12 is circulated through the heat pump mode expansion valve 16. A heat having a high temperature is generated in the water-cooled heat exchanger 15 by such circulation of the refrigerant. The heat thus generated is transferred to a heater core side cooling water circulation line 30. The heat transferred to the heater core side cooling water circulation line 30 is radiated into the passenger compartment through a heater core 32 to heat the passenger compartment.

The integrated heat management system for a vehicle may further include a water-cooled battery cooling device 20 for cooling a battery B.

The water-cooled battery cooling device 20 may include a second refrigerant line 22 capable of diverting a part of the refrigerant in the first refrigerant line 12, a battery cooling expansion valve 24 for expanding and depressurizing the refrigerant in the second refrigerant line 22, a refrigerant-cooling water heat exchanger 26 for introducing the expanded/depressurized refrigerant to generate cold energy, and a cooling water circulation line 25 for delivering the cold energy generated in the refrigerant-cooling water heat exchanger 26 to a battery B.

The cooling water circulation line 25 is provided with a water pump 27 and is configured to circulate cooling water between the refrigerant-cooling water heat exchanger 26 and the battery B. Thus, the cold energy generated in the refrigerant-cooling water heat exchanger 26 is delivered to the battery B to cool the battery B.

At the time of cooling the passenger compartment, the battery cooling device 20 diverts a part of the refrigerant of the air conditioner 10 to the second refrigerant line 22. The diverted refrigerant is expanded and depressurized by the battery cooling expansion valve 24. Then, the expanded/depressurized refrigerant having a low temperature and the cooling water in the cooling water circulation line 25 are caused to exchange heat in the refrigerant-cooling water heat exchanger 26 to cool the cooling water. The cooled cooling water is circulated through the battery B using the cooling water circulation line 25 and the water pump 27, thereby cooling the battery B.

The battery cooling expansion valve 24 is a mechanical valve whose opening degree is automatically controlled according to the temperature of the refrigerant and is integrally provided with an externally-controlled shut-off valve 24a.

The externally-controlled shut-off valve 24a is turned on or off in response to an external control signal to prevent or permit introduction of the refrigerant into the battery cooling expansion valve 24.

Thus, the battery cooling expansion valve 24 is turned on or off, whereby the generation of cold energy in the refrigerant-cooling water heat exchanger 26 is permitted or interrupted to perform or stop the cooling of the battery B.

Next, the features of the integrated heat management system for a vehicle according to the present invention will be described in detail with reference to FIGS. 4 to 10.

Figure 4:
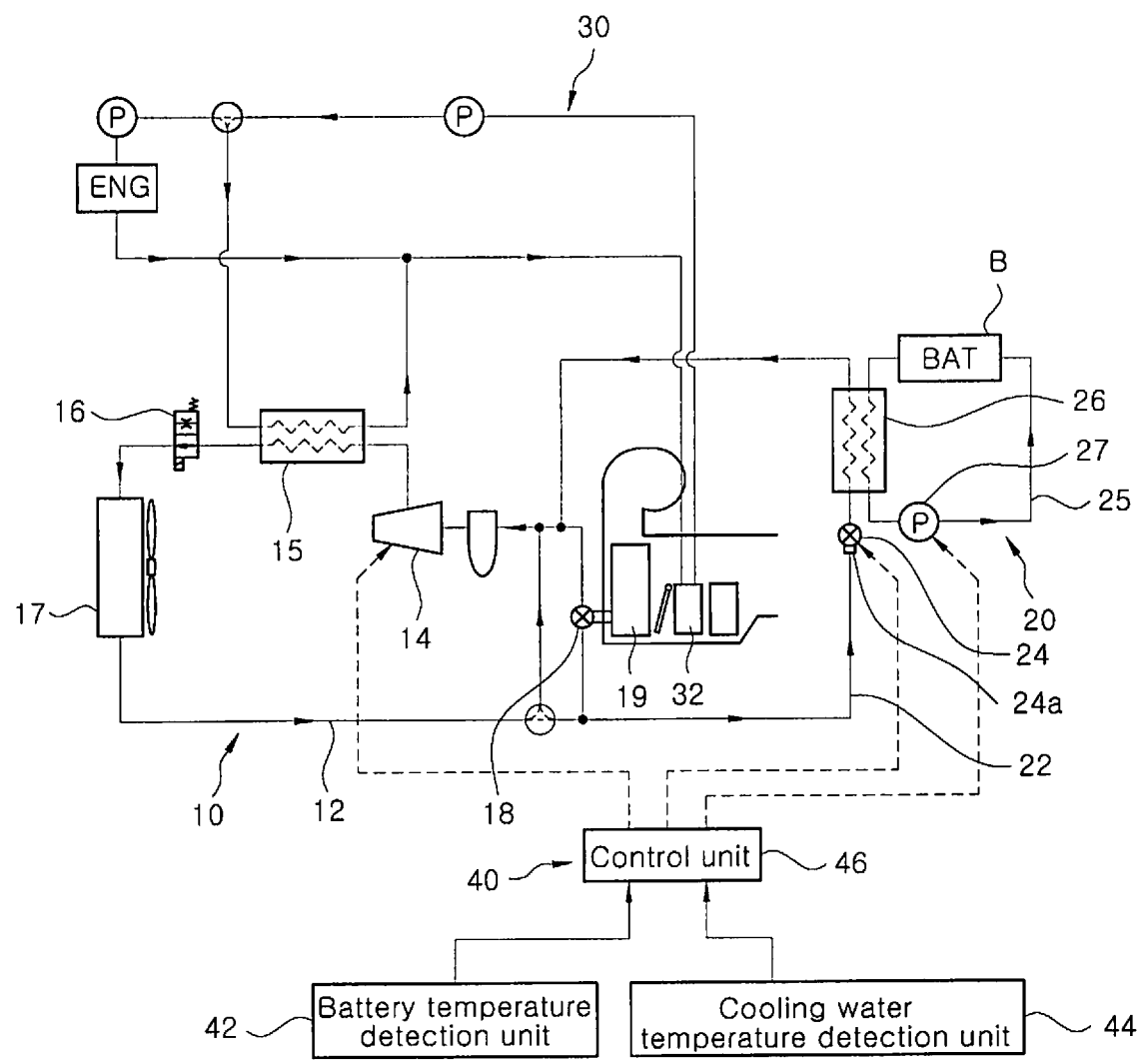
FIG. 4 is a diagram specifically showing a configuration of an integrated heat management system for a vehicle according to the present invention.

Referring first to FIG. 4, the integrated heat management system according to the present invention may include an air conditioning load change preventing unit 40 for preventing a sudden change in the air conditioning load of the air conditioner 10 which may be generated when the water-cooled battery cooling device 20 is turned on or off with respect to the air conditioner 10.

The air conditioning load change preventing unit 40 includes a battery temperature detection unit 42 configured to detect a temperature of the battery B and a cooling water temperature detection unit 44 configured to detect a temperature of the cooling water in the cooling water circulation line 25.

The battery temperature detection unit 42 may be a temperature sensor installed in the battery B. The battery temperature detection unit 42 detects the temperature of the battery B and inputs battery temperature data to a control unit 46 which will be described later.

The cooling water temperature detection unit 44 may be a temperature sensor installed in the cooling water circulation line 25 on the outlet side of the battery B. The cooling water temperature detection unit 44 detects the temperature of the cooling water flowing along the cooling water circulation line 25 and inputs cooling water temperature data to the control unit 46.

The air conditioning load change preventing unit 40 includes a control unit 46 for controlling the battery cooling device 20 and the air conditioner 10 according to the temperature data inputted from the battery temperature detection unit 42 and the cooling water temperature detection unit 44 when the battery cooling device 20 is to be additionally turned on in which the air conditioner 10 is operating in an air conditioner mode.

The control unit 46 is provided with a microprocessor and is configured to compare the battery temperature inputted from the battery temperature detection unit 42 and the cooling water temperature inputted from the cooling water temperature detection unit 44 with pre-stored temperatures in a state in which the air conditioner 10 is controlled in an air conditioner mode at the time of a cooling mode of a passenger compartment and the water-cooled battery cooling device turned off.

Specifically, the control unit 46 determines whether the battery temperature inputted from the battery temperature detection unit 42 is equal to or higher than a predetermined first battery reference temperature T1.

If it is determined that the battery temperature is equal to or higher than the first battery reference temperature T1, the control unit 46 recognizes that the battery B has a high temperature and needs to be cooled.

When such recognition is made, the control unit 46 comes into a primary cooling mode to turn on the water pump 27 of the cooling water circulation line 25.

Accordingly, the cooling water of the cooling water circulation line 25 is circulated to primarily cool the battery B. At this time, the control unit 46 controls the water pump 27 to have a maximum rotation speed, whereby the amount of the cooling water circulated through the battery 8 is increased as much as possible to enhance the cooling efficiency of the battery B.

The control unit 46 continuously monitors the battery temperature inputted from the battery temperature detection unit 42 and the cooling water temperature inputted from the cooling water temperature detection unit 44 while operating the water pump 27.

At this time, if the battery temperature inputted from the battery temperature detection unit 42 is increased to a second battery reference temperature T2 higher than the first battery reference temperature T1 and if the cooling water temperature inputted from the cooling water temperature detection unit 44 is equal to or higher than a predetermined first cooling water reference temperature T3, the control unit 46 recognizes that the battery B may be overheated due to the continued increase of the temperature of the battery B and, therefore, the battery B needs to be actively cooled.

When such recognition is made, the control unit 46 comes into a secondary cooling mode to turn off the water pump 27 of the cooling water circulation line 25, increase the rotation speed of the compressor 14 of the air conditioner 10 and open the battery cooling expansion valve 24 of the battery cooling device 20.

Accordingly, the flow amount of the refrigerant in the air conditioner 10 is increased, the refrigerant is depressurized and expanded while being diverted to the battery cooling expansion valve 24 of the battery cooling device 20, and the refrigerant-cooling water heat exchanger 26 is operated due to the depressurization/expansion operation of the refrigerant so that the battery B can be cooled secondarily.

The reason for turning off the water pump 27 by the control unit 46 in the secondary cooling mode is that if the water pump 27 is turned on, an excessive heat exchange action may occur on the side of the refrigerant-cooling water heat exchanger 26 and the cooling load of the air conditioner 10 may increase sharply.

Accordingly, by turning off the water pump 27 in the secondary cooling mode, it is possible to prevent an excessive heat exhaust action on the side of the refrigerant-cooling water heat exchanger 26, prevent a sudden increase in the cooling load of the air conditioner 10 and consequently prevent a sudden change in the temperature of the air discharged into the passenger compartment, which may be caused by the sudden increase in the cooling load of the air conditioner 10.

The control unit 46 is configured to make sure that, at the time of entry into the secondary cooling mode, an operation of turning off the water pump 27, an operation of increasing the rotation speed of the compressor 14 of the air conditioner 10 and an operation of opening the battery cooling expansion valve 24 are sequentially performed with a predetermined time lag.

The reason for adopting this configuration is to prevent the excessive heat exchange action on the side of the refrigerant-cooling water heat exchanger 26 as described above and to prevent a sudden increase in the cooling load of the air conditioner 10, thereby preventing a sudden change in the temperature of the air discharged into the passenger compartment, which may be caused by the sudden increase in the cooling load of the air conditioner 10.

Meanwhile, the control unit 46 comes into a secondary cooling mode to turn off the water pump 27 and to increase the rotation speed of the compressor 14 of the air conditioner 10. If a predetermined time, for example, 30 seconds, is elapsed in a state in which the battery cooling expansion valve 24 is opened, the control unit 46 turns the water pump 27 on.

Accordingly, the cooling water in the cooling water circulation line 25 is circulated to cool the battery B.

At this time, the control unit 46 controls the water pump 27 to have a minimum rotation speed. Thus, the amount of the cooling water circulated through the battery is limited to a minimum level to prevent an excessive heat exchange action on the side of the refrigerant-cooling water heat exchanger 26 and to prevent a sudden increase in the cooling load of the air conditioner 10.

Meanwhile, if the temperature of the battery B is increased in a state in which the rotation speed of the water pump 27 is controlled to a minimum level, the control unit 46 linearly controls the rotation speed of the water pump 27 in proportion to the temperature increase.

Accordingly, as the temperature of the battery B grows higher, the amount of the cooling water circulated through the battery B is increased in proportion thereto. Thus, as the temperature of the battery B grows higher, the cooling efficiency of the battery B is increased to prevent the battery B from being overheated.

According to the present invention having the configuration as described above, when the battery B needs to be cooled in a state in which the air conditioner 10 is controlled in the air conditioner mode, the battery B is first cooled by the cooling water of the water-cooled battery cooling device 20 without having to immediately use the refrigerant of the air conditioner 10, and then the battery B is cooled by the refrigerant of the air conditioner 10 with a time lag.

Therefore, unlike the conventional technique in which the refrigerant of the air conditioner 10 is immediately used to cool the battery B, it is possible to prevent a sudden increase in the air conditioning load of the air conditioner 10 which may occur at the time of cooling the battery B.

Figure 5:
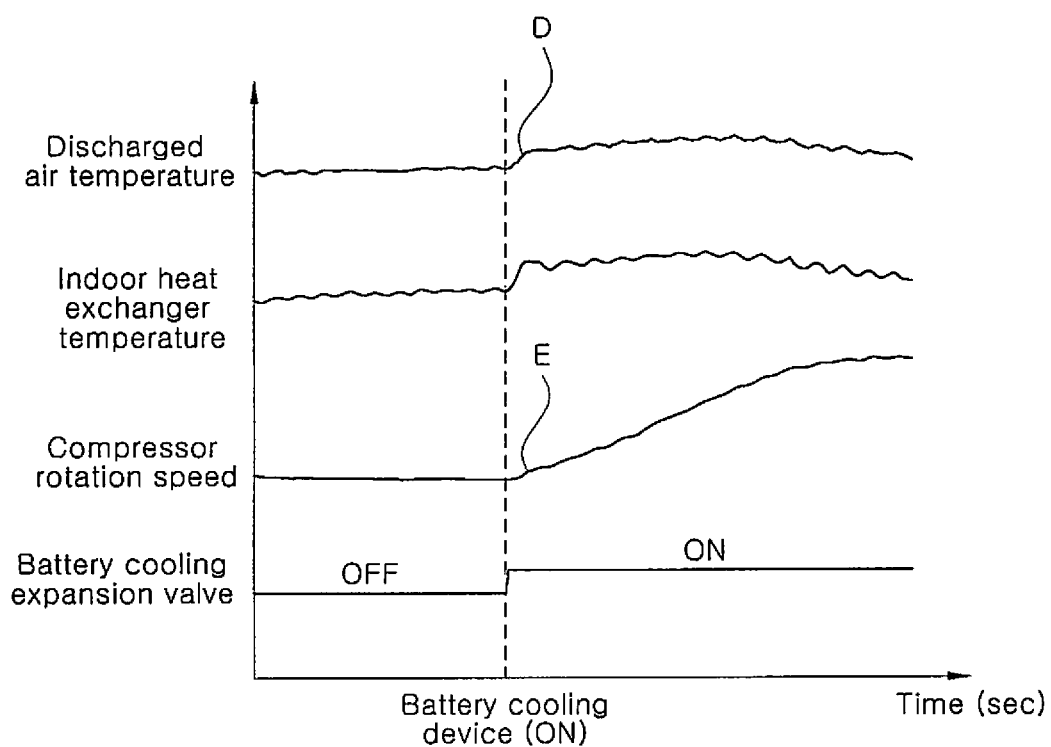

Therefore, as shown in FIG. 5, even if the battery cooling expansion valve 24 of the battery cooling device 20 is turned on, the temperature of the air discharged into the passenger compartment is not increased suddenly (as indicated by D), and the rotation speed of the compressor 14 of the air conditioner 10 is not increased suddenly (as indicated by E). As a result, the comfort in the passenger compartment is improved, and the fuel efficiency of the vehicle is enhanced.

Referring again to FIG. 4, when there is no need to cool the battery B, the control unit 46 may need to turn off the battery cooling device 20 in a state in which the air conditioner 10 is operating in the air conditioner mode and the water-cooled battery cooling device 20 is in operation.

Even in this case, the control unit 46 controls the battery cooling device 20 and the air conditioner 10 according to the temperature data inputted from the battery temperature detection unit 42 and the cooling water temperature detection unit 44.

More specifically, the control unit 46 compares the battery temperature inputted from the battery temperature detection unit 42 and the cooling water temperature inputted from the cooling water temperature detection unit 44 with pre-stored temperatures while the air conditioner 10 is operating in the air conditioner mode at the time of the cooling mode of the passenger compartment and the battery cooling expansion valve 24 of the water-cooled battery cooling device 20 is opened.

Specifically, the control unit 46 determines whether the battery temperature inputted from the battery temperature detection unit 42 is equal to or lower than a third battery reference temperature T4 lower than the first battery reference temperature T1, or whether the cooling water temperature inputted from the cooling water temperature detection unit 44 is equal to or lower than a second cooling water reference temperature T5 which is lower than the first cooling water reference temperature T3.

If it is determined that the battery temperature is equal to or lower than the third battery reference temperature T4, or if it is determined that the cooling water temperature is equal to or lower than the second cooling water reference temperature T5, the control unit 46 recognizes that the temperature of the battery B is lowered and the cooling of the battery B is unnecessary.

When such recognition is made, the control unit 46 comes into a primary release mode to turn off the water pump 27 of the cooling water circulation line 25.

Thus, the circulation of the cooling water through the battery B is interrupted to primarily cool the battery B.

Meanwhile, if a predetermined time, for example, 10 seconds, is elapsed in a state in which the water pump 27 is turned off, the control unit 46 comes into a secondary release mode to reduce the rotation speed of the compressor 14 of the air conditioner 10 and to close the battery cooling expansion valve 24 of the battery cooling device 20.

Thus, the amount of the refrigerant flowing in the air conditioner 10 is reduced, and the battery cooling device 20 is completely turned off, whereby the cooling of the battery B is completely stopped.

When the control unit 46 comes into a secondary release mode, the control unit 46 makes sure that an operation of reducing the rotation speed of the compressor 14 and an operation of closing the battery cooling expansion valve 24 of the battery cooling device 20 are sequentially performed with a predetermined time lag.

The reason for adopting such a configuration is to minimize the heat exchange action on the side of the refrigerant-cooling water heat exchanger 26 and to prevent a sudden drop of the air conditioning load of the air conditioner 10, thereby preventing a sudden change in the temperature of the air discharged into the passenger compartment, which may be caused by the sudden drop of the air conditioning load of the air conditioner 10.

According to the present invention having such a configuration, when the cooling of the battery B becomes unnecessary in a state in which the air conditioner 10 is operating in the air conditioner mode, the circulation of the cooling water through the battery B is first stopped without immediately stopping the water-cooled battery cooling device 20, and then the water-cooled battery cooling device 20 is turned off with a time lag.

Accordingly, unlike the conventional technique in which the water-cooled battery cooling device 20 is immediately turned off when the cooling of the battery becomes unnecessary, it is possible to prevent a sudden drop of the air conditioning load of the air conditioner 10, which may occur at the time of stopping the cooling of the battery B.

Figure 6:
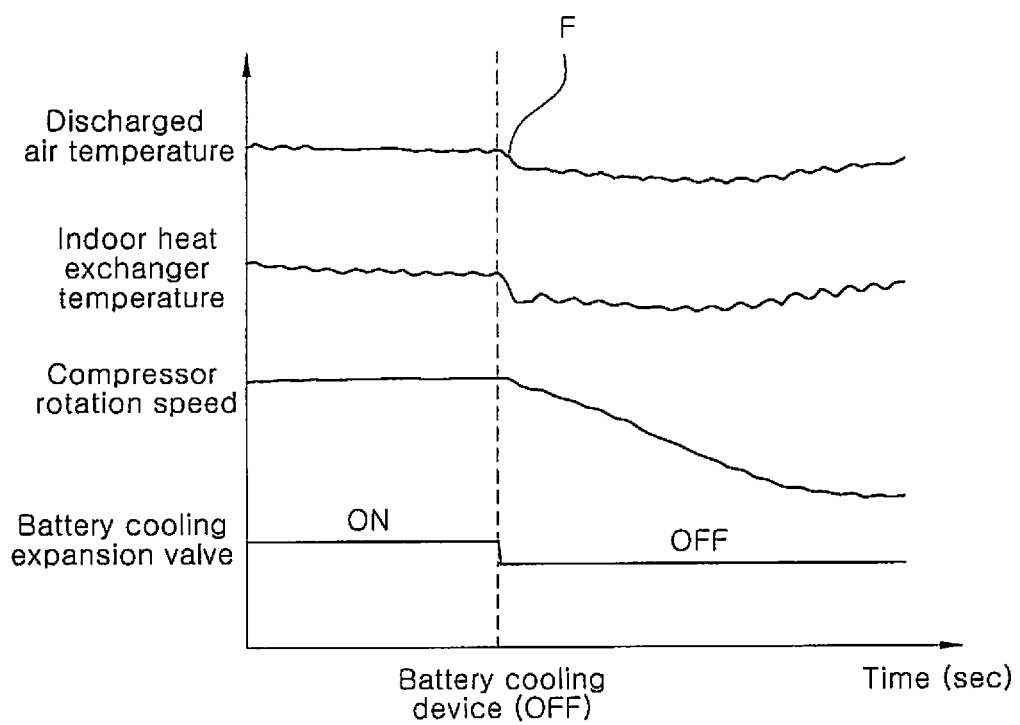

Thus, as shown in FIG. 6, even if the battery cooling expansion valve 24 of the battery cooling device 20 is turned off, the temperature of the air discharged into the passenger compartment does not drop sharply (as indicated by F). As a result, the comfort in the passenger compartment is improved.

Figure 7:
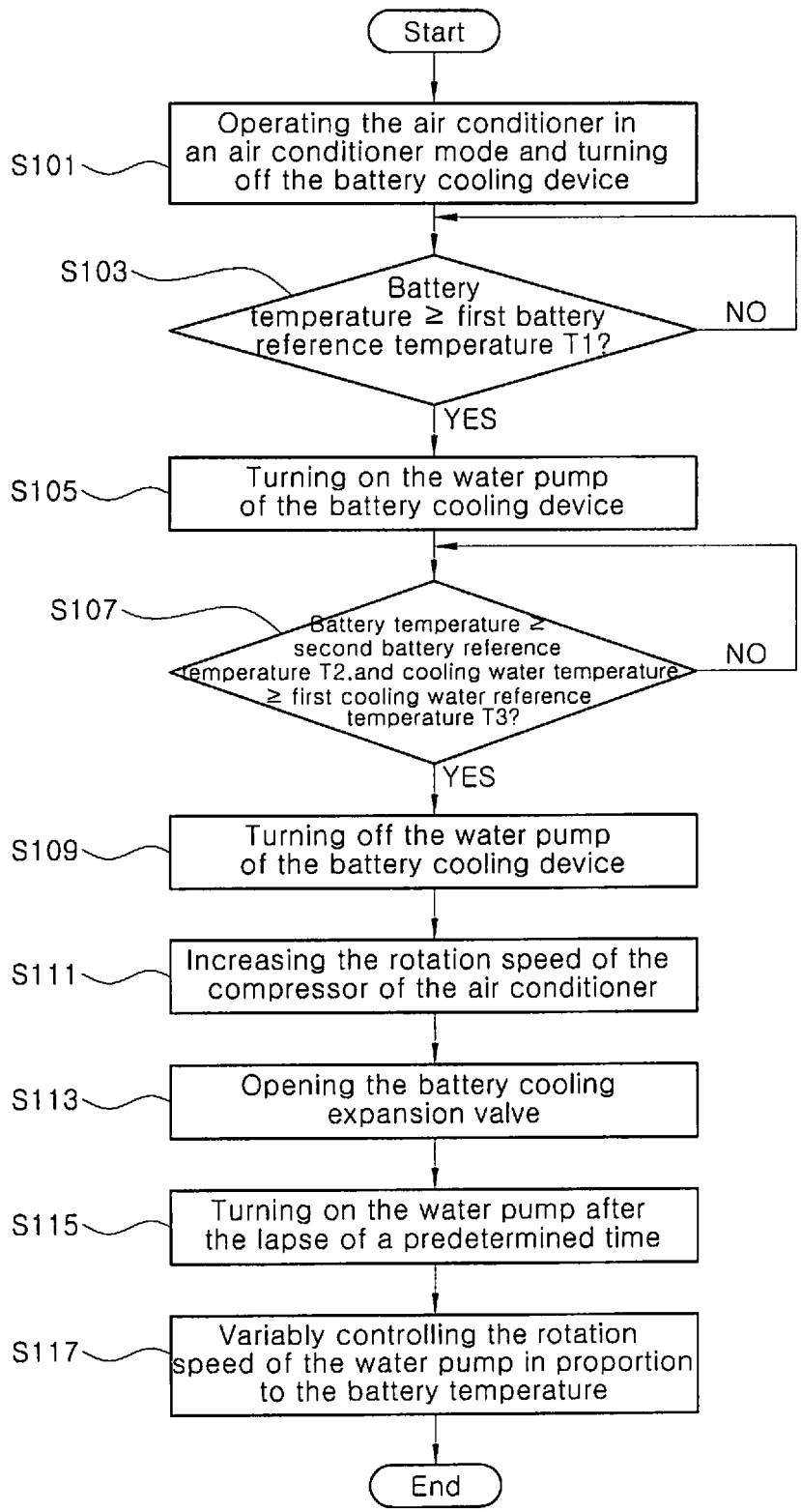
FIG. 7 is a flowchart showing an example of an operation of an integrated heat management system for a vehicle according to the present invention, wherein there is shown an operation example when a water-cooled battery cooling device is additionally turned on in a state in which an air conditioner is turned on at the time of cooling a passenger compartment.
Figure 8:
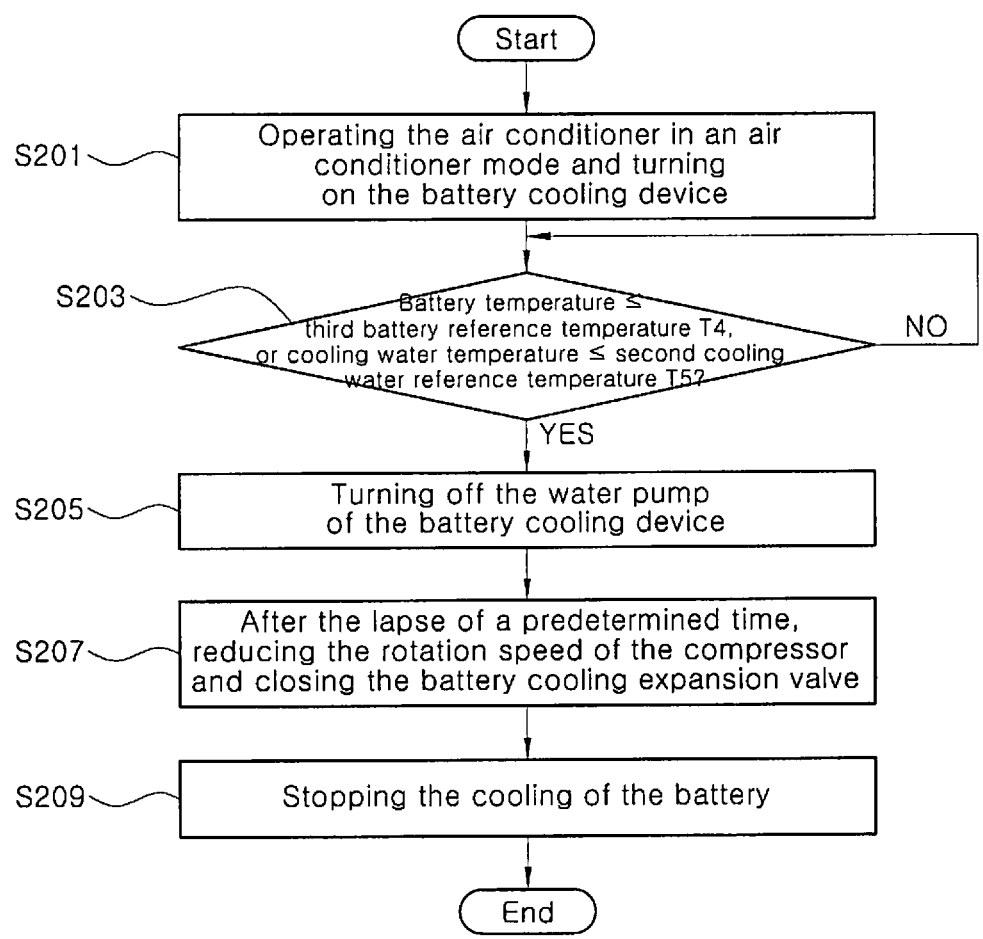
FIG. 8 is a flowchart showing an example of an operation of an integrated heat management system for a vehicle according to the present invention, wherein there is shown an operation example when a water-cooled battery cooling device is turned off in a state in which an air conditioner and a water-cooled battery cooling device are turned on at the time of cooling a passenger compartment.

Next, an operation example of the integrated heat management system for a vehicle according to the first embodiment of the present invention will be described with reference to FIGS. 4, 7 and 8.

First, an operation example when the battery cooling device 20 is additionally turned on in a state in which the air conditioner 10 is operating in the air conditioner mode will be described with reference to FIG. 7.

The air conditioner 10 is controlled in the air conditioner mode and the water-cooled battery cooling device 20 is turned off (S101). In this state, determination is made as to whether the temperature of the battery B is equal to or higher than a predetermined first battery reference temperature T1 (S103).

If it is determined that the temperature of the battery B is equal to or higher than the first battery reference temperature T1, the control unit 46 recognizes that the battery B has an increased temperature and needs to be cooled. Based on this recognition, the control unit 46 comes into a primary cooling mode to turn on the water pump 27 of the battery cooling device 20 (S105).

Then, the cooling water in the cooling water circulation line 25 is circulated to primarily cool the battery B. At this time, the control unit 46 controls the rotation speed of the water pump 27 to become highest.

While operating the water pump 27, determination is made again as to whether the temperature of the battery B is equal to or higher than a second battery reference temperature T2 which is higher than the first battery reference temperature T1 and the temperature of the cooling water in the cooling water circulation line 25 is equal to or higher than a predetermined first cooling water reference temperature T3 (S107).

If it is determined that the temperature of the battery B is equal to or higher than the second battery reference temperature T2 and the temperature of the cooling water is equal to or higher than the first cooling water reference temperature T3, the control unit 46 recognizes that the temperature of the battery B continues to increase and the battery B needs to be actively cooled.

When such recognition is made, the control unit 46 comes into a secondary cooling mode to turn off the water pump 27 of the cooling water circulation line 25 (S109), increases the rotation speed of the compressor 14 of the air conditioner 10 (S111) and opens the battery cooling expansion valve 24 of the battery cooling device 20 (S113).

Then, the flow amount of the refrigerant in the air conditioner 10 is increased. The refrigerant is depressurized and expanded while being diverted to the battery cooling expansion valve 24 of the battery cooling device 20. Due to the depressurization/expansion action of the refrigerant, the refrigerant-cooling water heat exchanger 26 is operated to secondarily cool the battery B.

If a predetermined time is elapsed after the entry into the secondary cooling mode, the control unit 46 turns the water pump 27 on (S115).

Then, the cooling water in the cooling water circulation line 25 is circulated to efficiently cool the battery B. At this time, the control unit 46 controls the rotation speed of the water pump 27 to become lowest.

If the temperature of the battery B is increased in a state in which the rotation speed of the water pump 27 is controlled to become lowest, the control unit 46 linearly and variably controls the rotation speed of the water pump 27 in proportion to the temperature increase.

As the temperature of the battery B grows higher, the amount of the cooling water circulated through the battery B is increased to enhance the cooling efficiency of the battery B.

Next, an operation example when the battery cooling device 20 is turned off in a state in which the air conditioner 10 is operating in the air conditioner mode and the battery cooling device 20 is in operation will be described with reference to FIG. 8.

First, the air conditioner 10 is controlled in the air conditioner mode and the water-cooled battery cooling device 20 is turned on (S201). In this state, the control unit 46 determines whether the temperature of the battery B is equal to or lower than a third battery reference temperature T4 which is lower than the first battery reference temperature T1, or whether the temperature of the cooling water in the cooling water circulation line 25 is equal to or lower than a second cooling water reference temperature T5 which is lower than the first cooling water reference temperature T3 (S203).

If it is determined that the temperature of the battery B is equal to or lower than the third battery reference temperature T4 or the temperature of the cooling water is equal to or lower than the second cooling water reference temperature T5, the control unit 46 recognizes that the temperature of the battery B is lowered and the cooling of the battery B is unnecessary.

When such recognition is made, the control unit 46 comes into a primary release mode to turn off the water pump 27 of the cooling water circulation line 25 (S205).

Then, the circulation of the cooling water through the battery B is interrupted to stop the cooling of the battery B.

If a predetermined time is elapsed after turning off the water pump 27, the control unit 46 comes into a secondary release mode to reduce the rotation speed of the compressor 14 of the air conditioner 10 and to close the battery cooling expansion valve 24 of the battery cooling device 20 (S207).

Then, the flow amount of the refrigerant in the air conditioner 10 is reduced and the battery cooling device 20 is turned off. As a result, the cooling of the battery B is stopped (S209).

Second Embodiment

Referring again to FIG. 4, the control unit 46 may need to turn on the water-cooled battery cooling device 20 to cool the battery B in a state in which the air conditioner 10 is turned off.

In this case, the control unit 46 controls the air conditioner 10 of the battery cooling device 20 according to the temperature data inputted from the battery temperature detection unit 42 and the cooling water temperature detection unit 44.

More specifically, the air conditioner 10 is turned off when the passenger compartment is not required to be cooled or when the passenger compartment is in a heating mode. At this time, the battery cooling device 20 may need to be turned on to cool the battery B.

In this case, the control unit 46 compares the battery temperature inputted from the battery temperature detection unit 42 and the cooling water temperature inputted from the cooling water temperature detection unit 44 with pre-stored temperatures.

Specifically, the control unit 46 determines whether the battery temperature inputted from the battery temperature detection unit 42 is equal to or higher than the second battery reference temperature T2 and whether the cooling water temperature inputted from the cooling water temperature detection unit 44 is equal to or higher than the first cooling water reference temperature T3.

If it is determined that the battery temperature is equal to or higher than the second battery reference temperature T2 and the cooling water temperature is equal to or higher than the first cooling water reference temperature T3, the control unit 46 recognizes that the battery B has an increased temperature and needs to be cooled.

When such recognition is made, the control unit 46 comes into a cooling mode to open the battery cooling expansion valve 24 of the water-cooled battery cooling device 20.

Accordingly, the refrigerant in the air conditioner 10 is depressurized and expanded while being diverted to the battery cooling expansion valve 24 of the battery cooling device 20. The refrigerant-cooling water heat exchanger 26 is operated by the depressurization/expansion action of the refrigerant.

The refrigerant in the air conditioner 10 has a certain level of pressure even when the air conditioner 10 is turned off. Thus, even if the air conditioner 10 is turned off, the refrigerant in the air conditioner 10 can be depressurized and expanded while being diverted to the battery cooling expansion valve 24 of the battery cooling device 20.

The control unit 46 turns the water pump 27 on with a predetermined time lag after the battery cooling expansion valve 24 is opened. Then, the control unit 46 turns the compressor 14 of the air conditioner 10 on.

Accordingly, the cooling water in the cooling water circulation line 25 is circulated to primarily cool the battery B, and the refrigerant in the air conditioner 10 is diverted to the battery cooling expansion valve 24 of the battery cooling device 20 under a predetermined pressure.

Therefore, cold energy having a low temperature is generated in the refrigerant-cooling water heat exchanger 26. The cold energy is used to cool the cooling water in the cooling water circulation line 25. The cooling water is circulated through the battery B to cool the battery B.

When turning on the water pump 27, the control unit 46 controls the water pump 27 to rotate at a lowest rotation speed. Furthermore, when operating the compressor 14 of the air conditioner 10, the control unit 46 controls the compressor 14 to rotate at a predetermined target rotation speed.

The reason for adopting such a configuration is to minimize the amount of the cooling water circulated through the battery B and to prevent excessive rotation of the compressor 14. This makes it possible to prevent an excessive heat exchange action on the side of the refrigerant-cooling water heat exchanger 26, thereby preventing a sudden increase in the cooling load of the air conditioner 10 and preventing unnecessary energy consumption.

If the temperature of the battery B is increased in a state in which the rotation speed of the water pump 27 is controlled to a minimum level, the control unit 46 linearly controls the rotation speed of the water pump 27 in proportion to the temperature increase.

Thus, as the temperature of the battery B grows higher, the amount of the cooling water circulated through the battery B is increased in proportion thereto. As a result, the cooling efficiency of the battery B is increased in proportion to the increase in the temperature of the battery B, thereby preventing the battery B from being overheated.

Referring gain to FIG. 4, there may be a case where the cooling of the battery B becomes unnecessary and the control unit 46 has to turn off the battery cooling device 20 in a state in which the air conditioner 10 is operating regardless of the cooling of the passenger compartment and the water-cooled battery cooling device 20 cools the battery B with the refrigerant of the air conditioner 10.

Even in this case, the control unit 46 controls the battery cooling device 20 and the air conditioner 10 according to the temperature data inputted from the battery temperature detection unit 42 and the cooling water temperature detection unit 44.

More specifically, the control unit 46 compares the battery temperature inputted from the battery temperature detection unit 42 and the cooling water temperature inputted from the cooling water temperature detection unit 44 with pre-stored temperatures in a state in which the air conditioner 10 is in operation and the battery cooling expansion valve 24 of the water-cooled battery cooling device 20 is opened.

Specifically, the control unit 46 determines whether the battery temperature inputted from the battery temperature detection unit 42 is equal to or lower than the third battery reference temperature T4, or whether the cooling water temperature inputted from the cooling water temperature detection unit 44 is equal to or lower than the second cooling water reference temperature T5.

If it is determined that the battery temperature is equal to or lower than the third battery reference temperature T4, or if the cooling water temperature is equal to or lower than the second cooling water reference temperature T5, the control unit 46 recognizes that the battery B has a reduced temperature and does not have to be cooled.

When such recognition is made, the control unit 46 comes into a primary release mode to turn off the water pump 27 of the cooling water circulation line 25.

Thus, the circulation of the cooling water through the battery B is interrupted to primarily stop the cooling of the battery B.

Meanwhile, if a predetermined time, for example, 10 seconds, is elapsed in a state in which the water pump 27 is turned off, the control unit 46 comes into a secondary release mode to turn off the compressor 14 of the air conditioner 10 and to close the battery cooling expansion valve 24 of the battery cooling device 20.

Thus, the air conditioner 10 is turned off, and the battery cooling device 20 is completely turned off, whereby the cooling of the battery B is completely stopped.

When the control unit 46 comes into the secondary release mode, the control unit 46 makes sure that an operation of turning off the compressor 14 and an operation of closing the battery cooling expansion valve 24 of the battery cooling device 20 are sequentially performed with a predetermined time lag.

The reason for adopting such a configuration is to minimize the heat exchange action on the side of the refrigerant-cooling water heat exchanger 26 and to prevent a sudden drop of the air conditioning load of the air conditioner 10.

Figure 9:
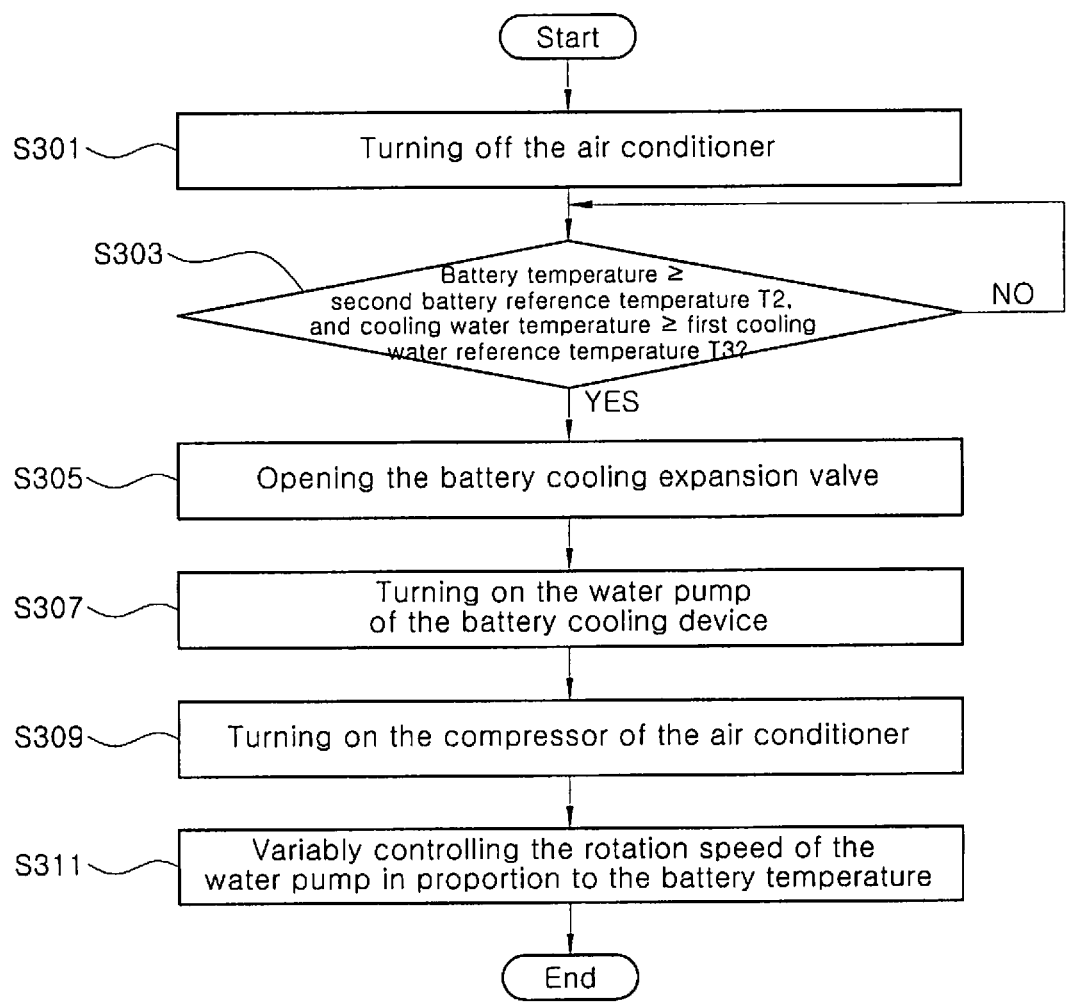
FIG. 9 is a flowchart showing an example of an operation of an integrated heat management system for a vehicle according to the present invention, wherein there is shown an operation example when a water-cooled battery cooling device needs to be turned on to cool a battery in a state in which an air conditioner is turned off at the time of not cooling a passenger compartment or in a heating mode of a passenger compartment.
Figure 10:
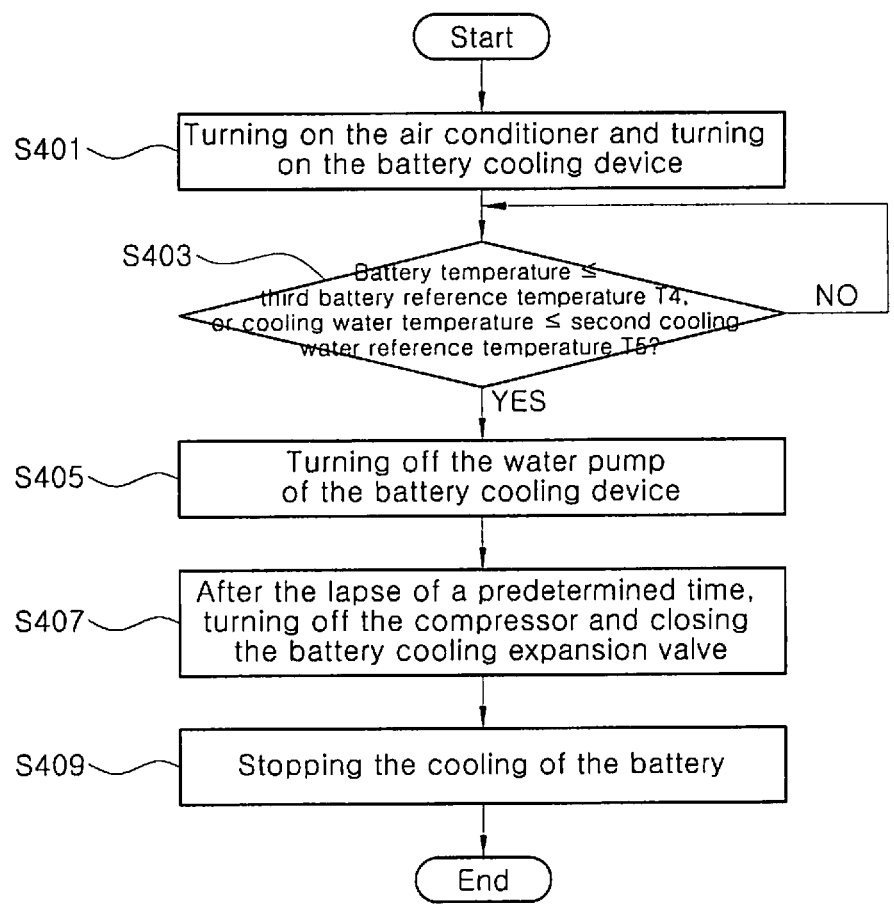
FIG. 10 is a flowchart showing an example of an operation of an integrated heat management system for a vehicle according to the present invention, wherein there is shown an operation example when a water-cooled battery cooling device is turned off in a state in which an air conditioner and a water-cooled battery cooling device are turned on at the time of not cooling a passenger compartment or in a heating mode of a passenger compartment.

Next, an operation example of the second embodiment having such a configuration will be described with reference to FIGS. 4, 9 and 10.

First, an operation example when the cooling of the battery B is required and the water-cooled battery cooling device 20 is to be turned on in a state in which the air conditioner 10 is turned off will be described with reference to FIG. 9.

The air conditioner 10 is turned off (S301). In this state, the control unit 46 determines whether the temperature of the battery B is equal to or higher than the second battery reference temperature T2 and whether the temperature of the cooling water in the cooling water circulation line 25 is equal to or higher than the first cooling water reference temperature T3 (S303).

If it is determined that the temperature of the battery B is equal to or higher than the second battery reference temperature T2 and the temperature of the cooling water is equal to or higher than the first cooling water reference temperature T3, the control unit 46 recognizes that the battery B has an increased temperature and needs to be cooled.

When such recognition is made, the control unit 46 comes into a cooling mode to open the battery cooling expansion valve 24 of the water-cooled battery cooling device 20 (S305).

Then, the refrigerant in the air conditioner 10 is depressurized and expanded while being diverted to the battery cooling expansion valve 24 of the battery cooling device 20. The refrigerant-cooling water heat exchanger 26 is operated by the depressurization/expansion action of the refrigerant.

The control unit 46 turns the water pump 27 on with a predetermined time lag after the battery cooling expansion valve 24 is opened (S307). Then, the control unit 46 turns the compressor 14 of the air conditioner 10 on (S309).

Then, the cooling water in the cooling water circulation line 25 is circulated to primarily cool the battery B, and the refrigerant in the air conditioner 10 is diverted to the battery cooling expansion valve 24 of the battery cooling device 20 under a predetermined pressure to operate the refrigerant-cooling water heat exchanger 26.

As a result, cold energy having a low temperature is generated in the refrigerant-cooling water heat exchanger 26. The cold energy is used to cool the cooling water in the cooling water circulation line 25, thereby cooling the battery B.

If the temperature of the battery B is increased in a state in which the water pump 27 is turned on, the control unit 46 linearly and variably controls the rotation speed of the water pump 27 in proportion to the temperature increase (S311).

As the temperature of the battery B grows higher, the amount of the cooling water circulated through the battery B is increased to enhance the cooling efficiency of the battery B.

Next, an operation example when the cooling of the battery B becomes unnecessary and the control unit 46 has to turn off the battery cooling device 20 in a state in which the air conditioner 10 is turned on regardless of the cooling of the passenger compartment and the battery B is being cooled with the refrigerant of the air conditioner 10 will be described with reference to FIG. 10.

First, the air conditioner 10 is turned on and the water-cooled battery cooling device 20 is turned on (S401). In this state, the control unit 46 determines whether the temperature of the battery B is equal to or lower than the third battery reference temperature T4, or whether the temperature of the cooling water in the cooling water circulation line 25 is equal to or lower than the second cooling water reference temperature T5 (S403).

If it is determined that the temperature of the battery B is equal to or lower than the third battery reference temperature T4 or the temperature of the cooling water is equal to or lower than the second cooling water reference temperature T5, the control unit 46 recognizes that the temperature of the battery B is lowered and the cooling of the battery B is unnecessary.

When such recognition is made, the control unit 46 comes into a primary release mode to turn off the water pump 27 of the cooling water circulation line 25 (S405).

Then, the circulation of the cooling water through the battery B is interrupted to stop the cooling of the battery B.

If a predetermined time is elapsed after turning off the water pump 27, the control unit 46 comes into a secondary release mode to turn off the compressor 14 of the air conditioner 10 and to close the battery cooling expansion valve 24 of the battery cooling device 20 (S407).

Then, the air conditioner 10 is turned off and the battery cooling device 20 is turned off. As a result, the cooling of the battery B is stopped (S409).

While preferred embodiments of the present invention have been described above, the present invention is not limited to the above-described embodiments. Various modifications and changes may be made without departing from the scope and spirit of the present invention defined in the claims.

For example, the heat pump type air conditioner has been described above by way of example. However, the present invention is not limited thereto. The present invention may also be applied to a case where the refrigerant of the air conditioner is diverted to a plurality of evaporators to operate them.

In other words, when there is a plurality of evaporators using the refrigerant of the air conditioner, the operation timing and the operation order of the expansion valves of the respective evaporators may be differently controlled in order to prevent a sudden change in the air conditioning loads of the remaining evaporators when at least one of the evaporators is turned on or off.

Furthermore, there has been described a case where the operation timings of the expansion valve 24 and the water pump 27 are differently controlled according to the temperature of a specific device and the temperature of the cooling water in the cooling water circulation line 25. However, the operation order of the expansion valve 24 and the water pump 27 may be set differently according to the on/off operation of the compressor 14 of the first refrigerant line 12.

Particularly, when the refrigerant is diverted to the second refrigerant line 22 in a state in which the compressor 14 is turned on, the control unit 46 may first operate the water pump 27 of the cooling water circulation line 25 and may then operate the expansion valve 24.

Furthermore, the water pump 27 may be turned off before the expansion valve 24 is operated. The on/off operation of the water pump 27 may be controlled according to the temperature of a specific device.

In addition, when the refrigerant is diverted to the second refrigerant line 22 in a state in which the compressor 14 is turned off, the control unit 46 may first operate the expansion valve 24 and may then operate the water pump 27.

Since such a configuration is described in the first and second embodiments, the detailed description thereof will be omitted.

What is claimed is:

1. An integrated heat management system for a vehicle, comprising:
   an air conditioner configured to cool or heat a passenger compartment using a refrigerant;
   a water-cooled cooling device configured to cool a specific device using the refrigerant of the air conditioner; and
   an air conditioning load change preventing unit configured to prevent a sudden change in an air conditioning load of the air conditioner when turning on or off the water-cooled cooling device with respect to the air conditioner,
   wherein the air conditioner includes a first refrigerant line configured to cool or heat the passenger compartment, a second refrigerant line configured to divert a part of the refrigerant in the first refrigerant line, an expansion valve installed in the second refrigerant line, a refrigerant-cooling water heat exchanger installed in the second refrigerant line, a cooling water circulation line configured to transfer cold energy of the refrigerant to a the specific device using the refrigerant-cooling water heat exchanger and a water pump configured to circulate cooling water through the cooling water circulation line,
      wherein the air conditioning load change preventing unit includes a control unit configured to differently control operation timings of the expansion valve and the water pump when the water-cooled cooling device is turned on or off with respect to the air conditioner,
   wherein the water-cooled cooling device is a water-cooled battery cooling device configured to cool a battery,
   wherein the expansion valve is a battery cooling expansion valve having a shut-off function, and the control unit is configured to differently control the operation timings of the expansion valve and the water pump according to a temperature of the battery and a temperature of the cooling water in the cooling water circulation line when the water-cooled battery cooling device is turned on or off with respect to the air conditioner, and
   wherein when the air conditioner is operating in the air conditioner mode and the water-cooled battery cooling device is in operation, the control unit comes into a primary release mode to turn off the water pump if the temperature of the battery is equal to or lower than a third battery reference temperature which is lower than a first battery reference temperature or if the temperature of the cooling water in the cooling water circulation line is equal to or lower than a second cooling water reference temperature which is lower than the first cooling water reference temperature, and then comes into a secondary release mode to reduce the rotation speed of the compressor of the air conditioner and to close the battery cooling expansion valve to stop cooling of the battery if a predetermined time is elapsed after entry into the primary release mode.

2. The system of claim 1, wherein the control unit executes control such that, when coming into the secondary release mode, an operation of reducing the rotation speed of the compressor of the air conditioner and an operation of closing the battery cooling expansion valve are sequentially performed with a predetermined time lag between.

3. An integrated heat management system for a vehicle, comprising:
   an air conditioner configured to cool or heat a passenger compartment using a refrigerant;
   a water-cooled cooling device configured to cool a specific device using the refrigerant of the air conditioner; and
   an air conditioning load change preventing unit configured to prevent a sudden change in an air conditioning load of the air conditioner when turning on or off the water-cooled cooling device with respect to the air conditioner,
   wherein the air conditioner includes a first refrigerant line configured to cool or heat the passenger compartment, a second refrigerant line configured to divert a part of the refrigerant in the first refrigerant line, an expansion valve installed in the second refrigerant line, a refrigerant-cooling water heat exchanger installed in the second refrigerant line, a cooling water circulation line configured to transfer cold energy of the refrigerant to a the specific device using the refrigerant-cooling water heat exchanger and a water pump configured to circulate cooling water through the cooling water circulation line,
   wherein the air conditioning load change preventing unit includes a control unit configured to differently control operation timings of the expansion valve and the water pump when the water-cooled cooling device is turned on or off with respect to the air conditioner,
   and wherein the water-cooled cooling device is a water-cooled battery cooling device configured to cool a battery,
   wherein the expansion valve is a battery cooling expansion valve having a shut-off function, and the control unit is configured to differently control the operation timings of the expansion valve and the water pump according to a temperature of the battery and a temperature of the cooling water in the cooling water circulation line when the water-cooled battery cooling device is turned on or off with respect to the air conditioner,
   wherein a first battery reference temperature is predetermined,
   wherein a second battery reference temperature is determined,
   wherein a first cooling water reference temperature is determined, and
   wherein when the air conditioner is operating in an air conditioner mode regardless of cooling of the passenger compartment and the water-cooled battery cooling device is in operation, the control unit comes into the primary release mode to turn off the water pump if the temperature of the battery is equal to or lower than a third battery reference temperature or if the temperature of the cooling water in the cooling water circulation line is equal to or lower than a second cooling water reference temperature, and then comes into the secondary release mode to turn off the compressor of the air conditioner and to close the battery cooling expansion valve to stop cooling of the battery if a predetermined time is elapsed after entry into the primary release mode.

4. The system of claim 3, wherein the control unit executes control such that, when coming into the secondary release mode, an operation of turning off the compressor of the air conditioner and an operation of closing the battery cooling expansion valve are sequentially performed with a predetermined time lag between.

* * * * *